March 17, 1959 A. BLAIN 2,878,024

RECORD PLAYING DEVICES

Filed April 29, 1952 12 Sheets-Sheet 1

INVENTOR.
Albert Blain
BY Harry Langsam
Attorney

March 17, 1959 A. BLAIN 2,878,024

RECORD PLAYING DEVICES

Filed April 29, 1952 12 Sheets-Sheet 2

INVENTOR.
Albert Blain
BY Harry Langsam
Attorney

March 17, 1959 A. BLAIN 2,878,024

RECORD PLAYING DEVICES

Filed April 29, 1952 12 Sheets-Sheet 3

INVENTOR.
Albert Blain
BY Harry Langsam
attorney

March 17, 1959

A. BLAIN 2,878,024

RECORD PLAYING DEVICES

Filed April 29, 1952

12 Sheets-Sheet 4

INVENTOR.

ALBERT BLAIN

BY

Woodcock and Phelan

ATTORNEYS

INVENTOR.
ALBERT BLAIN
BY
Woodcock and Phelan
ATTORNEYS

March 17, 1959 A. BLAIN 2,878,024

RECORD PLAYING DEVICES

Filed April 29, 1952 12 Sheets-Sheet 6

INVENTOR.
ALBERT BLAIN
BY
Woodcock and Phelan
ATTORNEYS

March 17, 1959 A. BLAIN 2,878,024

RECORD PLAYING DEVICES

Filed April 29, 1952 12 Sheets-Sheet 7

INVENTOR.
ALBERT BLAIN

BY Woodcock and Phelan
ATTORNEYS

INVENTOR.
ALBERT BLAIN
BY
Woodcock and Phelan
ATTORNEYS

March 17, 1959 A. BLAIN 2,878,024

RECORD PLAYING DEVICES

Filed April 29, 1952 12 Sheets-Sheet 9

INVENTOR.
ALBERT BLAIN
BY
Woodcock and Phelan
ATTORNEYS

INVENTOR.
ALBERT BLAIN
BY
Woodcock and Phelan
ATTORNEYS

INVENTOR.
ALBERT BLAIN
BY
Woodcock and Phelan
ATTORNEYS

March 17, 1959 A. BLAIN 2,878,024
RECORD PLAYING DEVICES
Filed April 29, 1952 12 Sheets-Sheet 12

INVENTOR.
ALBERT BLAIN
BY
Woodcock and Phelan
ATTORNEYS

United States Patent Office 2,878,024
Patented Mar. 17, 1959

2,878,024
RECORD PLAYING DEVICES

Albert Blain, Philadelphia, Pa.

Application April 29, 1952, Serial No. 285,023
35 Claims. (Cl. 274—10)

This invention relates to record playing devices and particularly to record changers of the type suited sequentially to play the records of a stack supported above the record turntable.

In general, it is a purpose of the invention to provide a small, inexpensive record changer having relatively few parts, which can be readily adjusted and serviced and which is quite immune to injury by the unskilled handling commonly incident to its use in the home.

In accordance with one feature of the invention which is common to various disclosed embodiments thereof, the vertical and horizontal motions of the pickup arm required during the change cycle are derived from a cam-follower sleeve which rotates with the turntable spindle during playing of a record and which moves axially of the spindle during a change cycle. In avoidance of possible jamming, a reciprocating cam groove on the spindle is closed at both ends and is continuously engaged by the cam-follower.

Further in accordance with the invention, initiation of a change cycle is effected by trip mechanism which stops rotation of the cam-follower sleeve with the turntable spindle. The automatic trip mechanism which stops such rotation upon completion of playing of a record is actuated by a force having no appreciable lateral component tending to cause wear of the needle or the record groove or to cause groove-jumping. The preferred automatic trip mechanism includes a pivoted gage, rotatable with the pickup arm, which insures positive initiation of the change cycle when the pickup arrives at a predetermined record radius. In some embodiments, rotation of the sleeve may be stopped by a manual trip to initiate a change cycle before completion of playing of a record.

Further in accordance with the invention, the axial movement of the cam-follower is converted into rocking movement of an arm, which movement is in turn converted by a group of relatively movable plates into vertical and horizontal motions of the pickup arm. In a preferred arrangement, one of the plates may be restrained upon release of the last record of a stack to preclude replaying thereof.

Further in preferred embodiments of the invention, the transmission of power from the rocker arm through the plates to the pickup arm is by spring means so that it is practically impossible to damage the motor or the changer mechanism by manually holding or moving the pickup arm during a change cycle.

Further in accordance with the invention, concurrently with rotation of a stack-supporting platform to the proper setting for a different diameter of record, the position of the pivotal axis of the pickup arm is shifted to suit the different radial distances of the starting groove of the selected size of record. The mechanism which effects vertical and horizontal movement of the pickup remains in the same location and is not shifted for different record diameters.

Further in accordance with the invention, a member movable to initiate the change cycle, the pivot for the pickup and a member movable to release the bottom record of a stack are all on a common shaft in simplication of the construction.

The invention further resides in novel features of construction, combination and arrangement hereinafter described and claimed.

For a more detailed understanding of the invention and for illustration of embodiments thereof, reference is made to the accompanying drawings in which.

Figure 1:
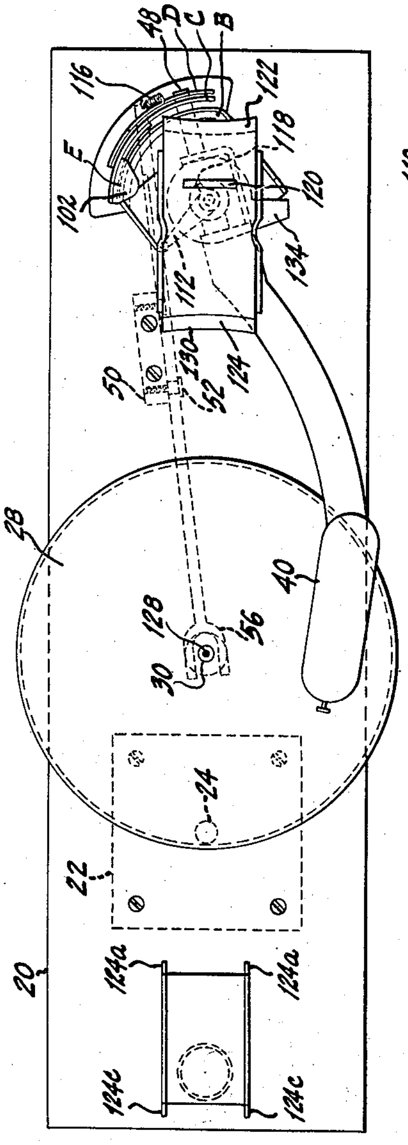
Fig. 1 is a top plan view of a record-changer.
Figure 2:
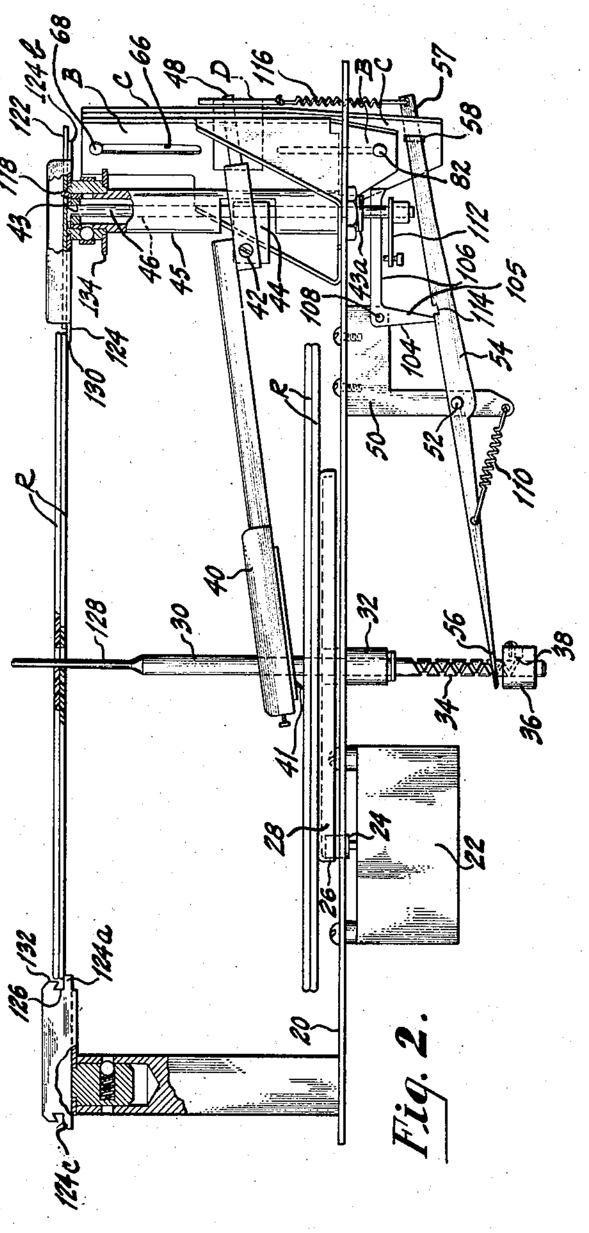
Fig. 2 is a side elevational view of the record-changer of Fig. 1.
Figure 3:
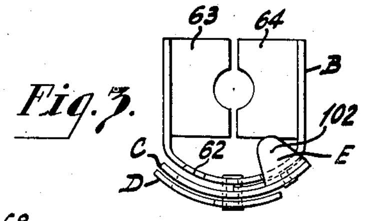
Figs. 3 and 4 are respectively top plan and elevational views of mechanism for actuating the pickup arm of Fig. 1.
Figures 6, 7:
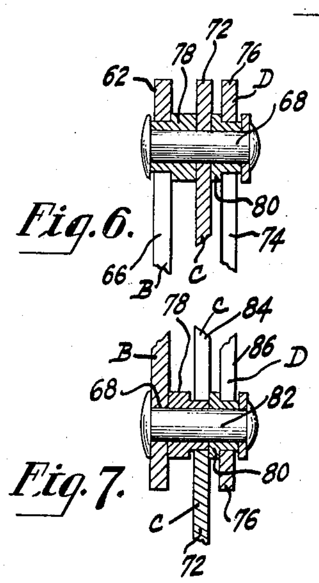
Figure 4:
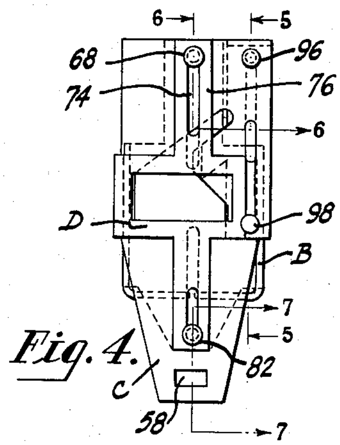
Figure 20:
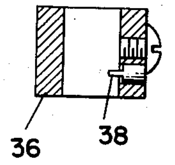
Figure 21:
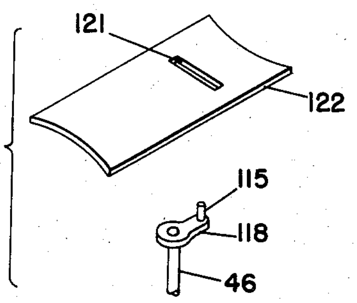
Figure 25:
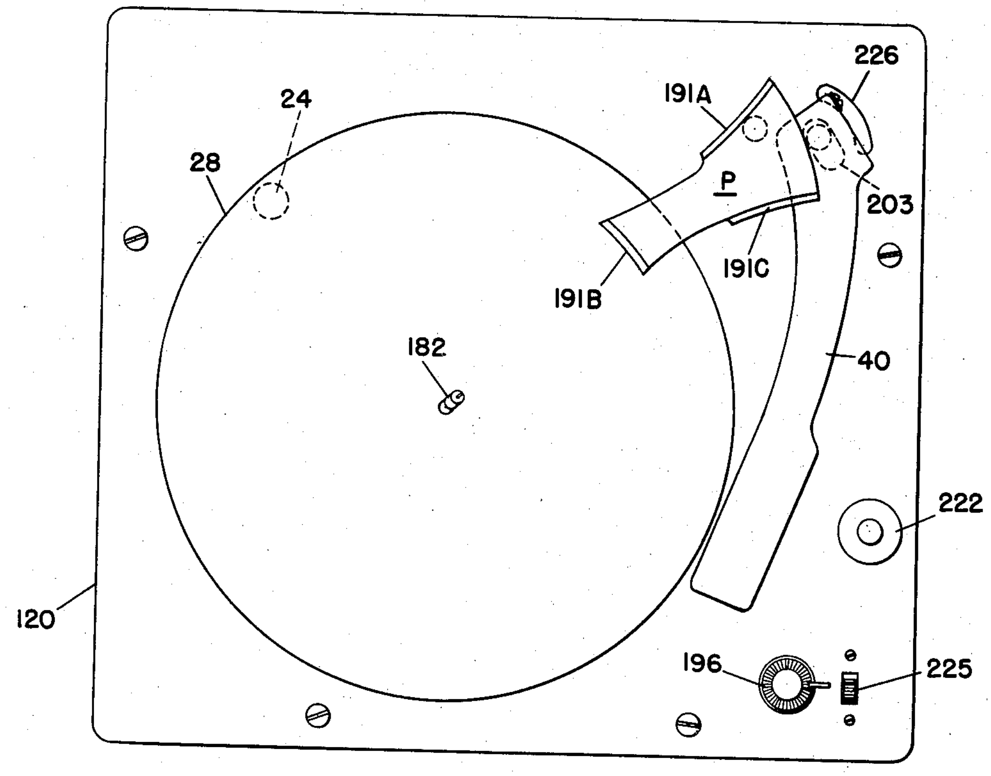
Figure 41:
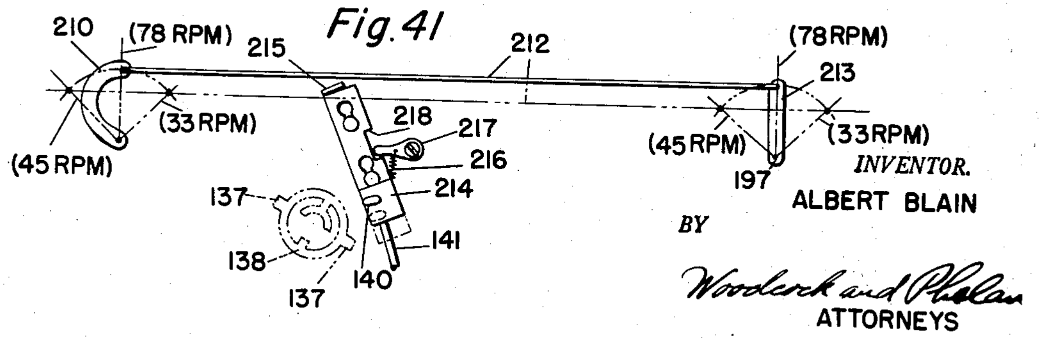
Figures 22A, 22B, 22C:
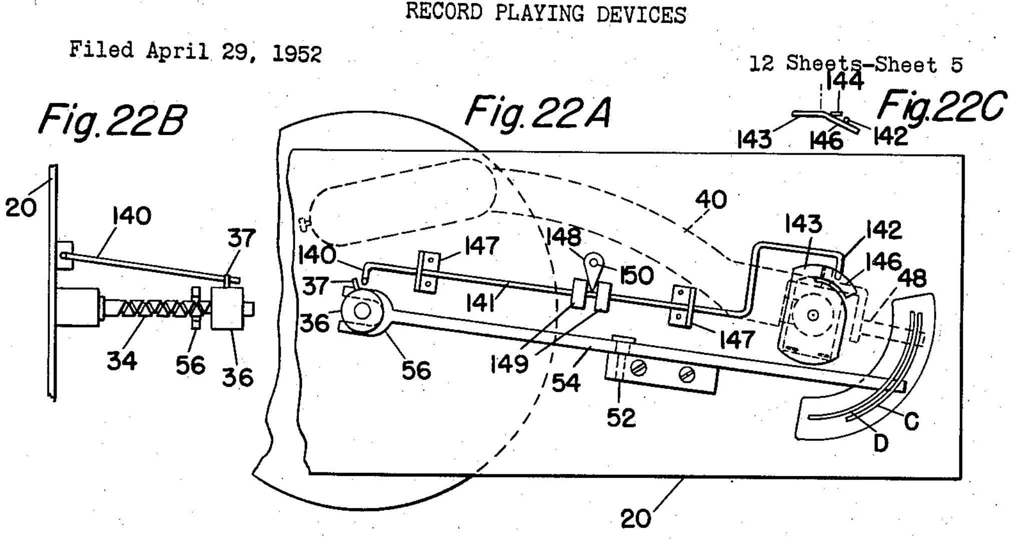
Figures 23A, 23B, 23C:
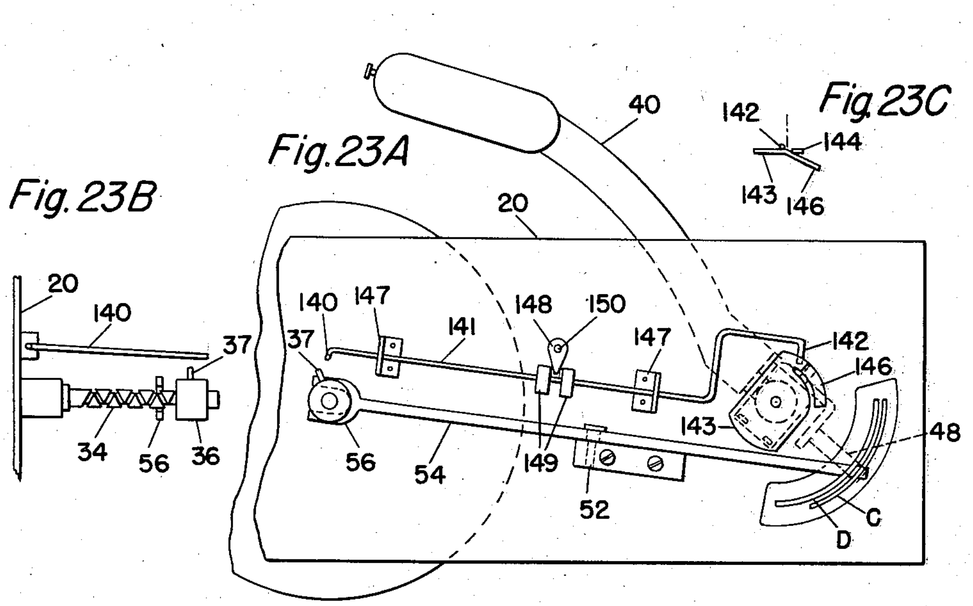
Figure 24:
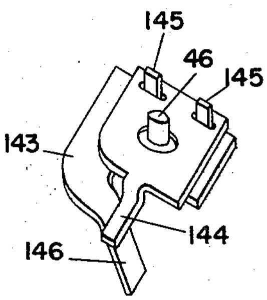
Figure 26:
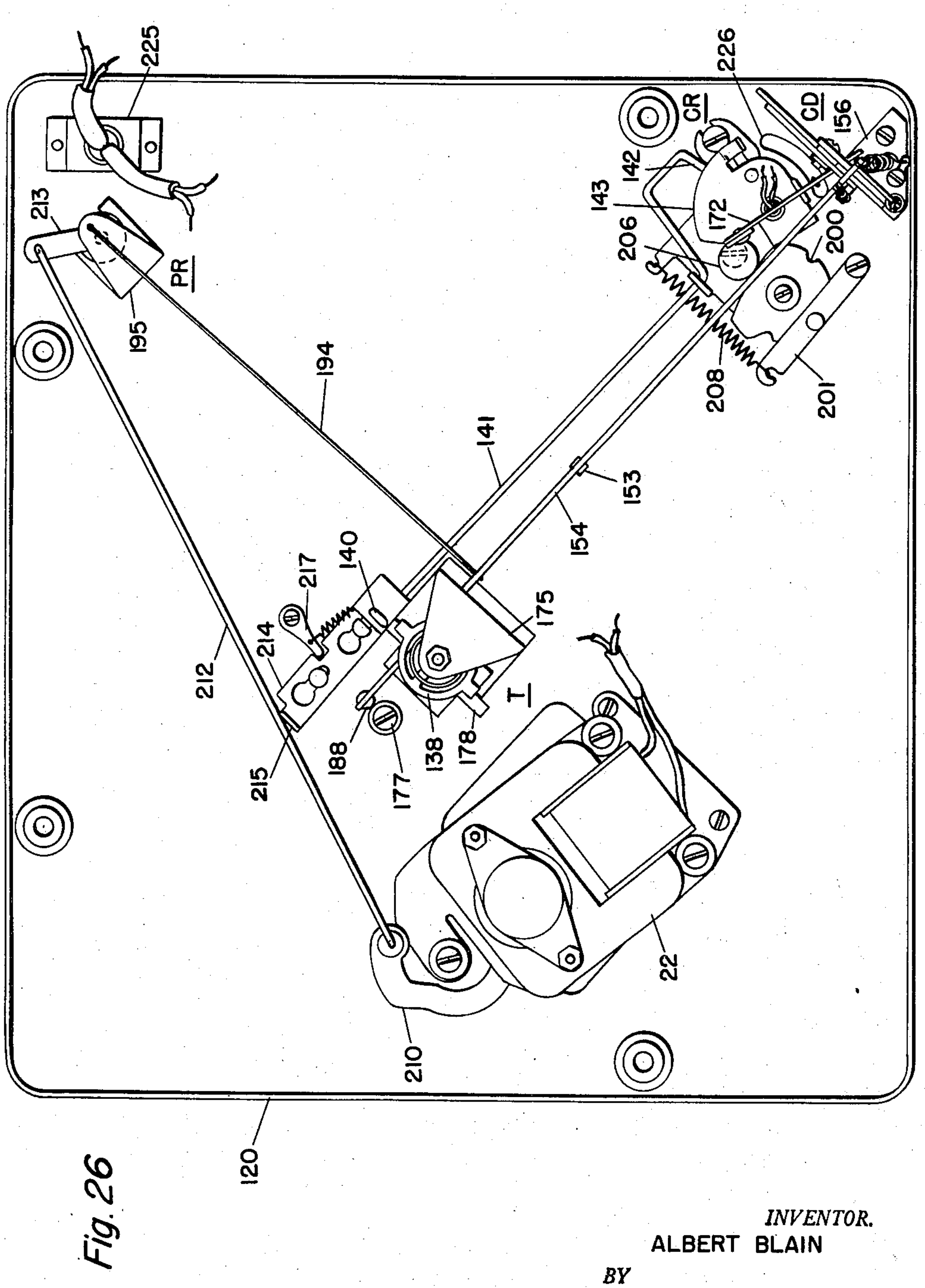
Figures 27, 28, 29:
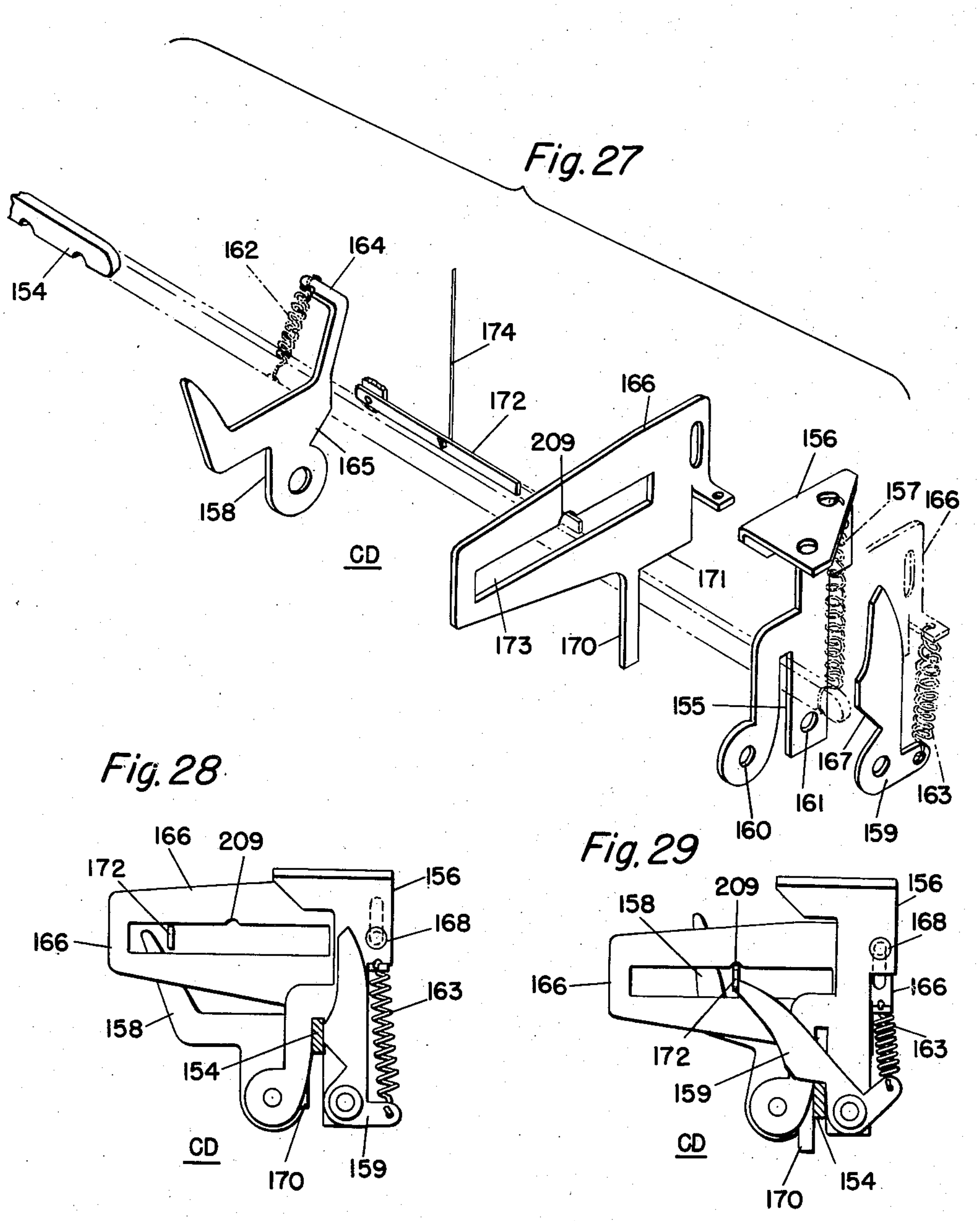
Figures 31, 32A, 32B, 33, 38A, 38B, 38C:
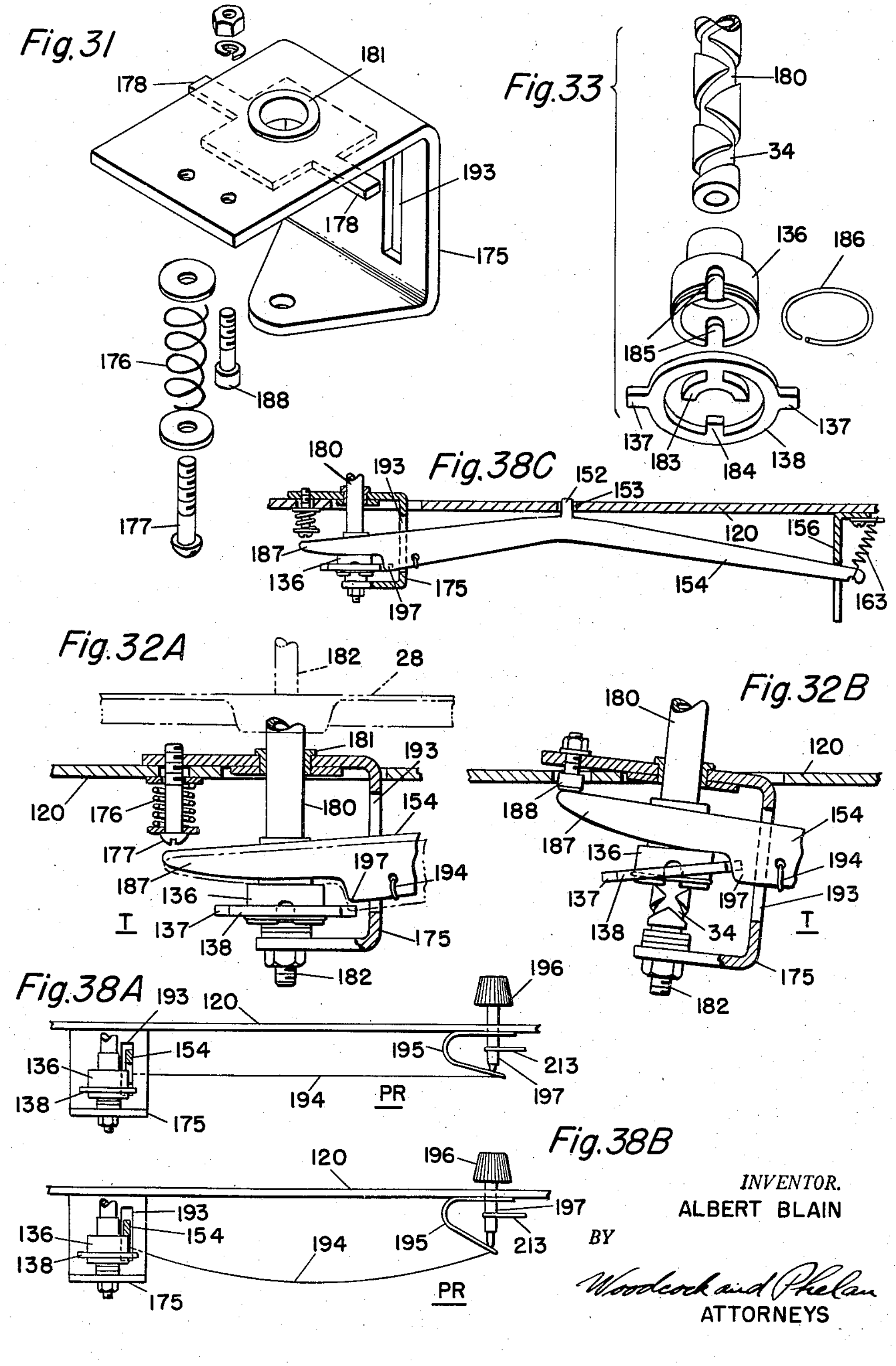
Figure 34:
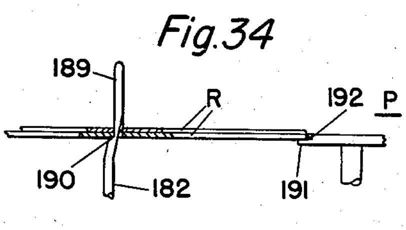
Figure 35:
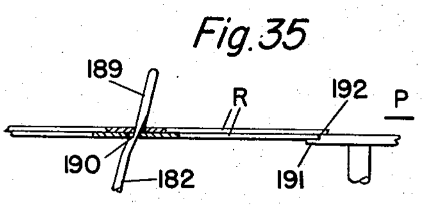
Figure 40A:
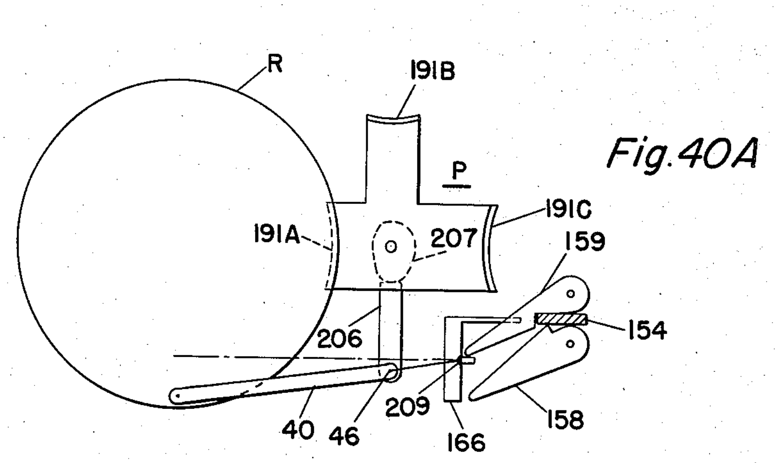
Figure 40B:
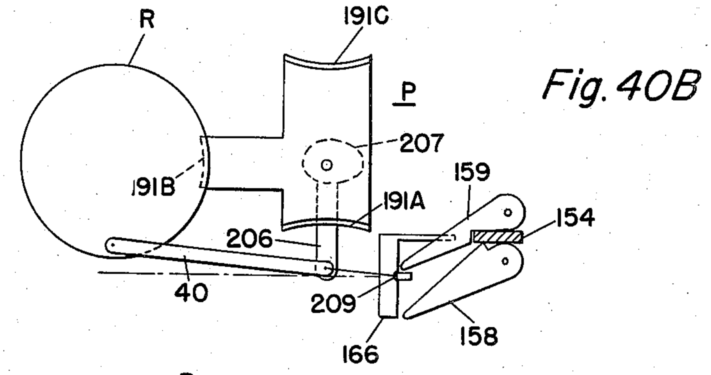
Figure 40C:
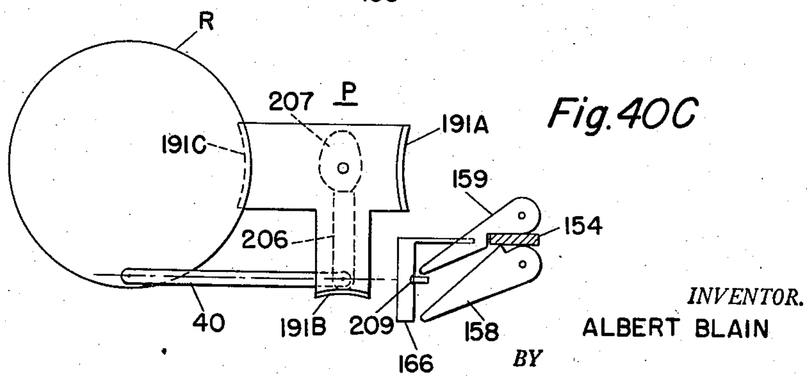
Figures 36A, 36B, 36C, 37A, 37B, 39:
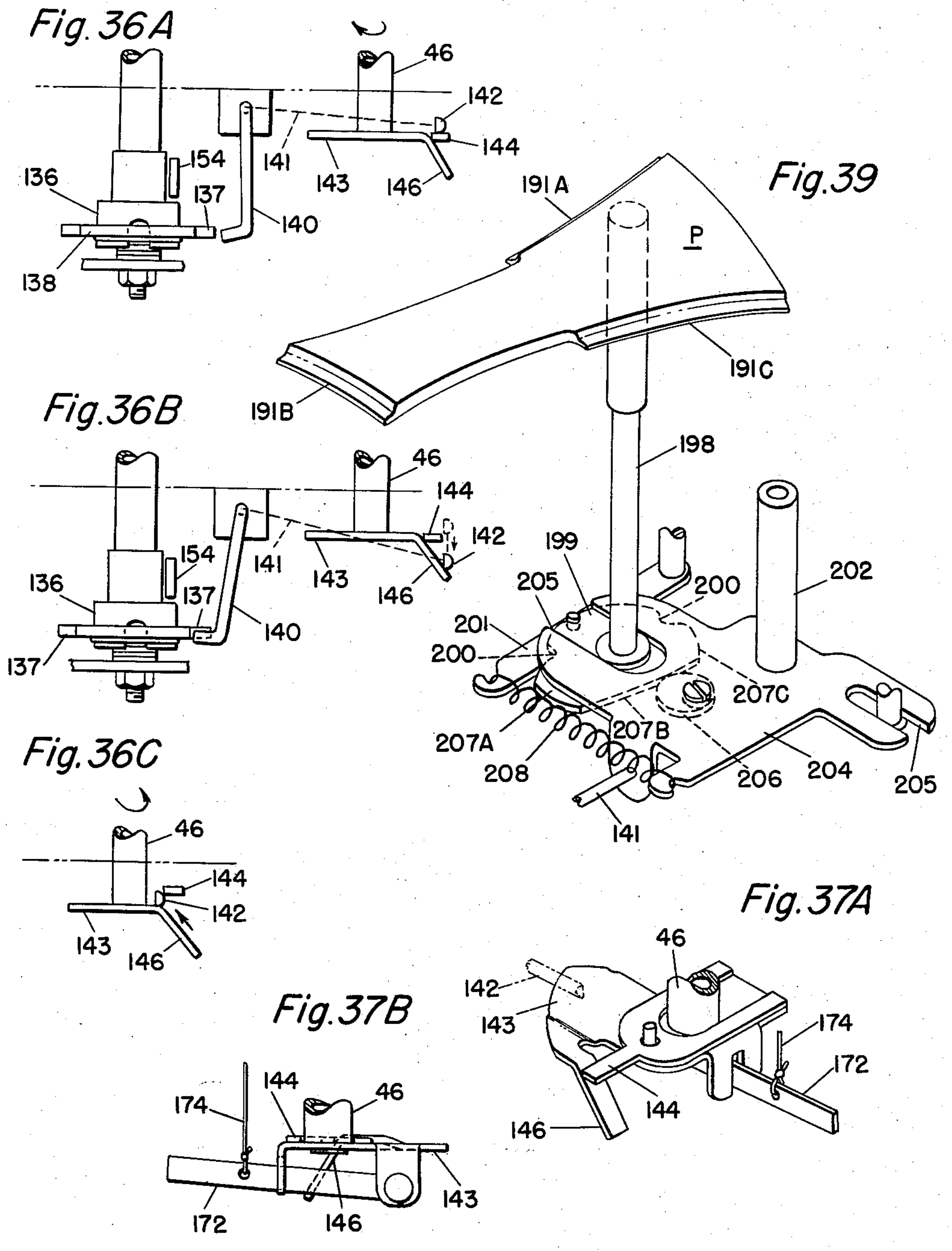
Figure 42A:
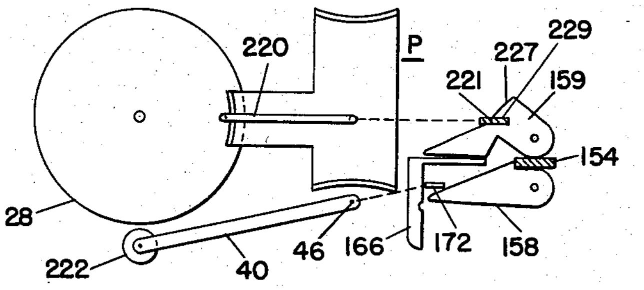
Figure 42B:
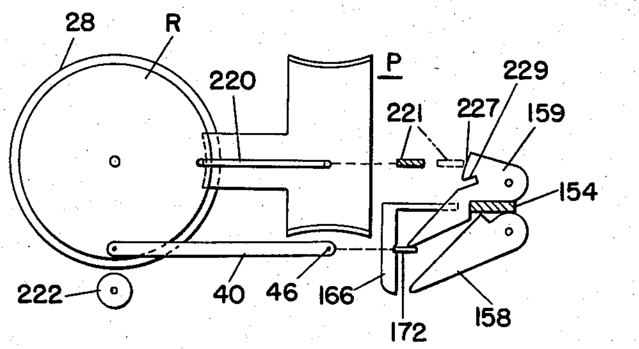
Figure 42C:
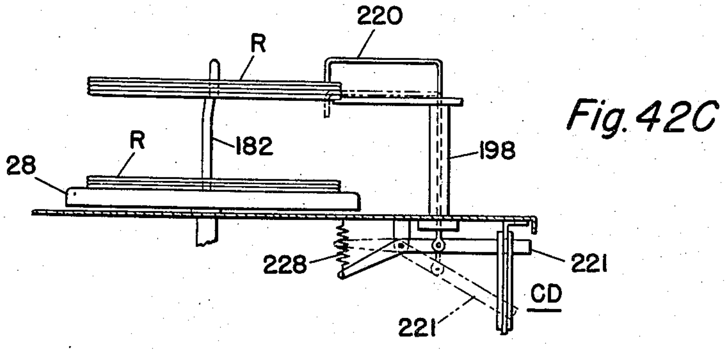

Figs. 6 and 7 are enlarged sectional views taken respectively on lines 6—6 and 7—7 of Fig. 4;

Figs. 8 to 11 are elevational views of individual components of the mechanism shown in Figs. 3 and 4;

Figs. 12 to 15 are explanatory figures referred to in discussion of the mechanism of Figs. 3, 4 for one size of record;

Figs. 16 to 19 are explanatory figures referred to in discussion of the mechanism of Figs. 3, 4 for a different size of record;

Fig. 20 is a detail view in section of a cam-follower and sleeve shown in Fig. 2;

Fig. 21 is a perspective view of components of record-ejector mechanism shown in Figs. 1 and 2;

Fig. 22A is a bottom plan view of another record-changer;

Figs. 22B and 22C are detail elevational views of trip mechanism shown in Fig. 22A;

Fig. 23A is a bottom plan view showing parts appearing in Fig. 22A in another operating position;

Figs. 23B and 23C are similar to Figs. 22B and 22C but showing positional relationships corresponding with Fig. 23A;

Fig. 24 is a perspective view of shelf and gage mechanism shown in Figs. 22A, 22C, 23A, 23C;

Figs. 25 and 26 are respectively top and bottom plan views of a third record-changer;

Fig. 27 is an exploded view of the mechanism of Figs. 25, 26 which actuates the pickup arm;

Figs. 28 and 29 illustrate the mechanism of Fig. 27 at different times in the change cycle;

Figs. 30A–30G schematically illustrate the positional relationships of the pickup arm, its actuating mechanism of Figs. 27–29, and the record post at different times in the change cycle;

Fig. 31 is an exploded view of the turntable mounting of Figs. 25, 26;

Figs. 32A, 32B are sectional views showing positions of the mounting of Fig. 31 and associated parts before and during a change cycle;

Fig. 33 is an exploded view showing the turntable spindle of Figs. 25, 26 and the components of an associated rotatable and reciprocable sleeve;

Figs. 34 and 35 are explanatory figures referred to in description of sequential dropping of records onto the turntable of Figs. 25, 26;

Figs. 36A–36C are explanatory figures referred to in discussion of control from pickup arm position of the sleeve of Figs. 32A, 32B;

Fig. 37A is a perspective view of tripping mechanism schematically shown in Figs. 36A–36C;

Fig. 37B is an elevational view of parts shown in Fig. 37A but rotated through a substantial angle;

Figs. 38A and 38B schematically show, in different positions, components of a reject mechanism shown in Fig. 26;

Fig. 38C is a detail view showing a rock bar of Figs. 26, 38A, 38B;

Fig. 39 is a perspective view of mechanism shown in Fig. 26 for repositioning the axis of the pickup arm for different diameters of record;

Figs. 40A–40C are explanatory figures referred to in discussion of Fig. 39;

Fig. 41 is an explanatory figure referred to in discussion of mechanism of Fig. 26 which shifts the trip mechanism with change in speed-setting of the changer of Figs. 25, 26;

Figs. 42A and 42B schematically illustrate a non-repeat mechanism for the changer of Figs. 25, 26;

Fig. 42C is an elevational view of the mechanism of Figs. 41A, 41B; and

Figure 42D:
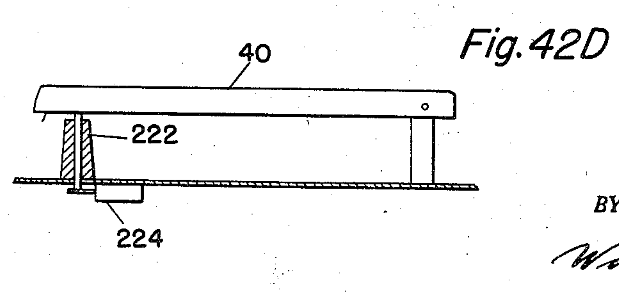

Fig. 42D illustrates an automatic stop ancillary to the mechanism of Figs. 41A, 41B, 41C.

Referring to Figs. 1 and 2 as illustrative of one form of record-changer embodying the invention, a constant speed motor 22 attached to the underside of mounting plate 20 drives the record turntable 28 whose rim 26 engages the friction wheel 24 on the motor shaft. The motor may be started and stopped by a switch, not shown.

The spindle 30 of the turntable 28 extends downwardly through bearing 32 attached to mounting plate 20. Below bearing 32, the spindle 30 has a cam groove 34 which receives a cam-follower 38 disposed within sleeve 36 (Figs. 2 and 20). The cam-follower 38 is free to move angularly in sleeve 36 but is precluded from longitudinal movement with respect thereto by the head of a screw or equivalent stop.

The cam groove 34 is of type termed "reciprocating" as it is a groove which reverses its direction at each of its opposite ends. During playing of a record, the sleeve 36 is in the axial position shown in Fig. 2 and rotates with spindle 30: upon initiation of a record-changing cycle, rotation of sleeve 36 with spindle 30 is precluded, the engagement between cam-follower 38 and cam-groove 34 thereupon effecting axial movement of sleeve 36 upwardly along spindle 30 and thence back to its original position where it remains for playing of the next record which in the meantime has been released from a stack supported above the turntable.

In the particular arrangement shown in Figs. 1 and 2, during playing of a record, the sleeve 36 is free of engagement with the fork 56 of a rocker arm 54 pivoted at 52 to bracket 50. During the playing period, the arm 104 of latch 105 prevents biasing spring 110 from moving arm 54 into engagement with sleeve 36 and the sleeve rotates with spindle 30 as above stated. At the end of playing of a record, latch 105 is rotated counterclockwise, by means later discussed, whereupon arm 104 thereof moves into notch 114 of arm 54, permitting spring 110 to rock the arm into engagement with sleeve 36. Because sleeve 36 is no longer free to rotate with spindle 30, the cam-follower 38 is tilted in the spindle cam groove 34 and forces the sleeve 36 to move upwardly along the spindle 30 and to rock arm 54 in clockwise direction. When the sleeve reaches the top of cam groove 34, it reverses its direction and arm 54 correspondingly rocks in counterclockwise direction.

When arm 54 reengages latch arm 104, which in the meantime has returned to the position shown in Fig. 2, it is restrained from further rocking movement about pivot 52 but sleeve 36 continues further downward movement until relieved of pressure whereupon its axial movement of the sleeve ceases and rotation of the sleeve with spindle 30 is resumed. This action occurs at the lower reversing portion of the cam groove.

The aforesaid rocking movements of arm 54 controlled by the motor-driven sleeve 38 are utilized, as later described, to effect vertical and horizontal movements of the pickup arm during the record-changing cycle between successive playing periods. Several mechanisms for such purpose are herein disclosed and another specifically different modification is disclosed and claimed in my co-pending application Serial No. 256,524, a continuation-in-part of my application Serial No. 108,994.

In the embodiment shown in Figs. 1 and 2, the pickup arm or tone arm 40 is pivotally attached at 42 to a bracket 44 for vertical motion toward and from the turntable 28. Bracket 44 is attached to shaft 46 which is supported by bearings 43, 43*a* in post 45 for rotation in a horizontal plane. Thus, the pickup arm is so mounted that it may be lowered to bring its needle 41 into engagement with a record on turntable 28, but it may be moved horizontally toward spindle 30 by tracking engagement of the needle with the record groove, and that it may be lifted and moved away from spindle 30 to allow another record to fall unhindered onto the turntable 28.

The raising, lowering and return movement of the pickup arm to a position above the starting groove of the next record to be played are derived from the rocking movement of arm 54 by cam plates C and D slidably attached to mounting bracket B for vertical reciprocation. The bracket B, as best shown in top plan view Fig. 3, has flanges 63, 64 for attaching it, as by clamping of the flanges by post 45, to the upper face of the main baseplate 20. With the bracket B in position, the pin 48, or equivalent extension of the pickup arm 40, passes through the large rectangular opening or slot 60 in the vertical arcuate wall 62 of bracket B and through cam openings 88, 90 (Figs. 8 and 9) of the reciprocable cam plates C and D. The righthand end of rocker arm 54 (Fig. 2) passes through a slot 58 in cam plate C and is connected to plate D by a spring 116.

Figure 8:
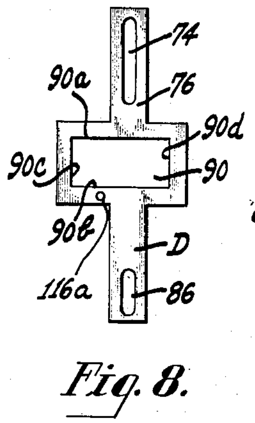
Figure 9:
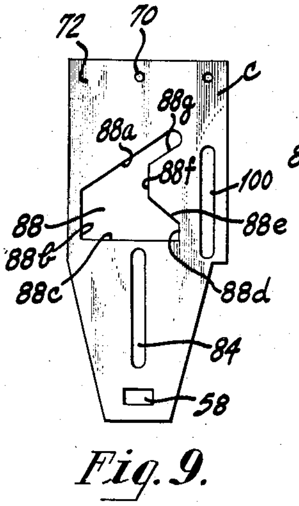

The plates C and D are slidably attached to each other and to bracket B by rivets 68 and 82, or equivalent, Figs. 6 and 7. Specifically, the rivet 68 passes through hole 70 of plate C and fastens spacers 78 and 80 to opposite sides of plate C. The opposite ends of rivet 68 respectively extend through the vertical guide slot 66 in bracket B (Fig. 11) and vertical guide slot 74 of plate D (Fig. 8). Thus, rivet 68 moves with plate C and slides with respect to plate D and bracket B. The rivet 82 passes through hole 68B in mounting bracket B (Fig. 11) and secures thereto a second set of spacers 78, 80 for the reciprocable plates C and D. This second, stationary rivet passes through vertical guide slot 84 in plate C and the shorter vertical guide slot 86 in plate D.

Figure 16:
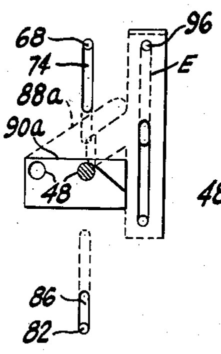
Figure 17:
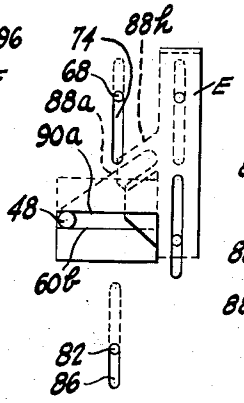
Figure 18:
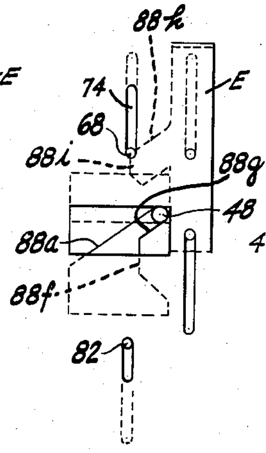
Figure 19:
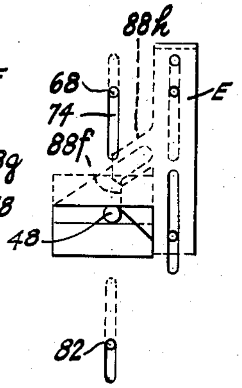

During playing of a record, the pin 48 of the pickup arm 40 is moved from left to right as viewed in Fig. 16 by the tracking engagement of the stylus or needle 41 of the pickup with the record groove. Upon completion of playing of the record, latch 105 is released by engagement of lever 112 at the lower end of the pickup arm shaft 46 (Fig. 2) which the cam formed at the end of arcuate arm 106 of the latch 105. Arm 54 is thus released and rocked first in clockwise direction and then in counterclockwise direction about its pivot 108 by sleeve 36 as previously herein described. Clockwise movement of arm 54, by virtue of direct contact with plate C and the spring connection to plate D, causes both plates to move downwardly so that edge 90*a* of plate D presses downwardly on pin 48 (Fig. 17) to lift the pickup arm 40 from the record on the turntable. As downward movement of plate D is limited by rivet stop 82 to the extent of slot 86, for further clockwise movement of arm 54, the plate D remains at its downward limit and plate C continues to move, with the result that cam surface 88*a* of plate C presses upon pin 48 to shift it to its extreme righthand position (Fig. 18) corresponding with the maximum horizontal displacement of the tone arm 40 from the turntable spindle 30. In this position, the tone arm is clear of the path of the record next to fall on the turntable 28.

At this time the rocker arm 54 reverses its direction of motion under control of spindle sleeve 36, whereupon cam plate C is moved upwardly by arm 57 so that the guide edge 88*g* of plate C (Fig. 18) positions the tone arm above the starting groove of the record now on the turntable. As arm 54 completes its return to the position shown in Fig. 2, the pickup arm 40 is lowered into the starting groove of the record. As the pickup arm is moved away from its nearest position to the spindle, the arm 112 moves away from the cam surface of arm 106 of latch 105 to allow the latch to return to the position shown in Fig. 2.

Figure 5:
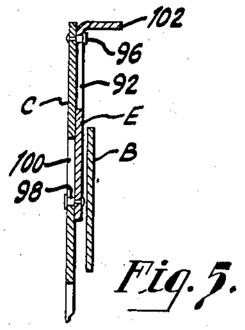
Fig. 5 is a sectional view taken on line 5—5 of Fig. 4.
Figure 10:
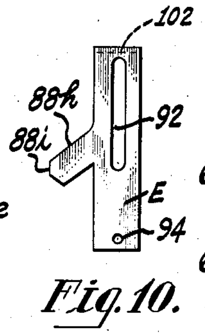
Figure 11:
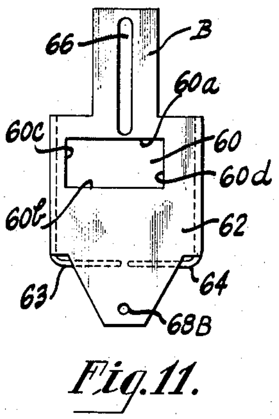

As thus far described, it has been assumed the record-changer is for playing records of one diameter, for example, 12 inch records. To adapt the changer for also playing records of smaller diameter, for example, 10 inches, a correction or compensator plate E, is added properly to position the pickup arm above the starting groove of such smaller record. As shown in Fig. 10, the compensator plate E has an elongated vertical slot 92 in its upper end slidably to engage a guiding rivet 96 (Fig. 5) fastened to cam plate C. A second guiding rivet 98, fastened to plate E at location fixed by hole 94 therein, is slidably received by vertical slot 100 of plate C. The plate E has a flange 102 which for playing of the larger diameter records is engaged by an arm 134 (Fig. 2) so that plate E does not move downwardly with plate C during the record-changing cycle but remains in its uppermost position as shown in Figs. 16 to 19. Consequently when the records are of such larger diameter, the cam plates C and D effect vertical and horizontal movement of the pickup arm as above described in discussion of Figs. 16 to 19.

Figure 15:
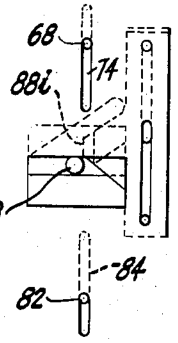

For playing of the smaller diameter records, the arm 34 is removed from position below ledge or flange 102 (Fig. 5) so that plate E is free to move with plate C as shown in Figs. 12 to 15. In such case, the surfaces 88*h* and 88*i* of plate E are effective during the record-changing cycle to actuate the pin 48 of the pickup arm to position above the starting groove of the smaller diameter record (Fig. 15). The different starting positions of pin 48 for the two different record diameters are best understood by comparison of Figs. 15 and 19.

Preferably, and as now described, the arm 134 for restraining or releasing the compensating plate E is coupled to the record stack support 124 which is rotated to different positions respectively corresponding with the two different record diameters so that concurrently with movement of the support to the proper position for a selected size of record, the arm 134 is moved to insure the proper starting position of the tone arm. More specifically, as shown in Fig. 2, the arm 134 is carried by a sleeve rotatably supported by post 45 and to the upper end of which the record support 124 is suitably attached. A ball detent, or equivalent, click mechanism, releasably holds this assembly in either of its aforesaid two positions.

As best shown in Fig. 2, the stack of records to be played rests upon supports 124, above described, and a second support 124A with the reduced end 128 of the turntable spindle 30 extending through the center holes of the stacked records. As indicated, the second support 124A is also rotatable to two positions which are 180° apart to accommodate records of two different diameters: for one position, the bottom record of the stack rests upon ledges 124*a* of support 124A whereas for larger diameter records, support 124A is rotated 180° so that ledges 124*c* thereof serve as a support.

An ejector plate 122 for releasing the bottom record of the stack is slidably mounted on stack support 124 and is provided with a transverse slot 120 for receiving the free end of crank 118 attached to the upper end of shaft 46 (Figs. 1 and 21). When, during the change cycle, the pickup arm 40 is swung to its extreme outer position, as discussed in connection with Figs. 14 and 18, the ejector plate 122 pushes the edge of the bottom record off of ledge 130 (or 124*b*) and moves below the next record of the stack. The bottom record, as it is being pushed by ejector 122, enters the narrow slot 126 of the opposite record support 124A. The slot 126 permits only one record to enter and so precludes the next upper record from moving beyond the guide or stop-edge 132 of support 124A.

As the lefthand edge of the bottom record is in slot 126, its fall is initially through an arc centered at slot 126. As the record continues to fall, the spindle extension 128 and spindle 30 forces the record rim from slot 126 and so allows the record to drop bodily onto turntable 28. As indicated in Fig. 2, the center of the records as resting on supports 124, 124A is offset to the right with respect to the axis of the spindle 30 to provide clearance between the spindle extension 128 and that side of the center hole of the records which is nearer the ejector plate 122. This provides a maximum support for the record stack and facilitates separation of the bottom record.

Figure 12:
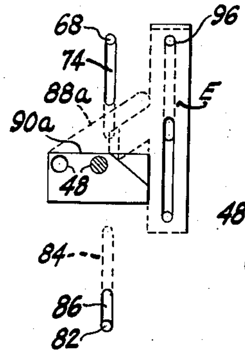
Figure 13:
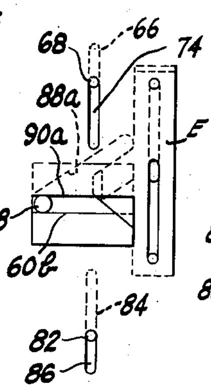
Figure 14:
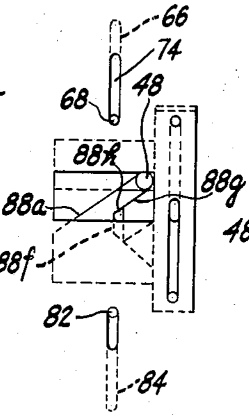

As above stated, the ejector plate 122 releases the bottom record when the pickup arm is in its outermost position (Fig. 14 or Fig. 18) so that it is out of the path of the falling record. Thereafter, the pickup arm 40 is automatically moved back toward the spindle over the starting groove (Fig. 15 or 19) of the record now on the turntable and is lowered to start playing as rocker arm 54 restores the cam plates C, D to their original positions (Fig. 12 or 16).

To start the record changer of Figs. 1, 2, a record is placed upon the turntable and a stack of records is positioned upon the supports 124, 124A, the motor 22 is started and needle 41 of arm 40 is manually placed in the starting groove of the revolving record. When the needle reaches the end of the record, the latch 105 is released to initiate a record-changing cycle during which the next record is released and the pickup arm is automatically lowered into the starting groove. When the record groove carries the pickup arm to the end of its playing position, the trip arm 112 again actuates latch 105 to initiate the next change cycle. Unless sooner terminated, this sequence repeats until the last record is dropped and thereafter the last record repeats until the motor 22 is turned off.

In the modification of Figs. 1 and 2 shown in Figs. 22A–22C, 23A–23C, 24, there is shown another method and arrangement for initiating the change cycle. The sleeve 36 is provided with a pin or equivalent projection 37 engageable by a finger 140 to arrest rotation of sleeve 36 with spindle 34. The finger 140 is connected to and may be an extension of one end of a rod 141 supported by bearing brackets 147 and having at its other end a trip 142 which rests upon a shelf 143 fastened to the lower end of shaft 46 of the pickup arm. In the particular arrangement shown, the trip is biased by gravity: alternatively or in addition it may be biased by a light spring. A gage 144, as best shown in Fig. 24, is hinged upon the shelf and is biased, as by gravity, to rest upon it.

As the pickup arm 40 approaches the end of a record being played, the trip 142 rides off the shelf 143 and onto the gage 144. As the pickup reaches the last groove of the record, the trip 142 abruptly drops from the gage 144 and consequently finger 140 moves from its fully retracted position into the path of rotation of the sleeve projection 37 (Fig. 22B). Rotation of sleeve 36 with spindle 34 is thus arrested and the sleeve moves upwardly to engage the forked end 56 of arm 54 as discussed in connection with Figs. 1 and 2. Continued upward movement of the sleeve 36 rocks the arm 54 to actuate the plates C, D which, through pin 48, raise the pickup arm 40 and rotate it horizontally about the axis of its shaft 46 away from the axis of the turntable. Such rotation of shaft 46 rotates the shelf 143 in reverse direction, causing the trip 142 to be forced up the incline 146 and under the pivoted gage 144 until the trip 142 again rests on the horizontal surface of the shelf 143, and the gage 144 drops to its resting position as shown in Fig. 22C.

As trip 142 moves up the incline 146, it rotates the rod 141 to swing the finger 140 out of the path of projection 37 of the then downwardly moving sleeve 36.

Gage 144 provides a definite tripping position precluding premature or delayed initiation of the change cycle. Were the gage omitted and the trip permitted to move down the incline 146, there would be uncertainty of engagement between finger 140 and sleeve projection 37. Since the last groove of the record is usually eccentric, the oscillating pickup would cause finger 140 to move toward and away from sleeve 36 and the phasing between the finger and sleeve projection may be such as to prevent a properly timed engagement. The sharply defined drop-off position that the gage provides for the trip insures proper timing for initiation of a change cycle.

The two trip mechanisms described in connection with Figs. 1, 2 and 22A, 23A may both be classified as "radius" trips because they are actuated when the pickup arm reaches a specific radius of the record. With the trip mechanism shown in Figs. 1 and 2, an accurate adjustment of this radius is provided by the adjusting screw shown on the trip arm 112: as the pickup approaches the desired radius of the record, this screw engages the tapered end of latch arm 106 and trips arm 104 into slot 114 to start a change cycle. With the trip mechanism shown in Figs. 22A, 23A, an accurate adjustment of this radius is provided by arm 148 which engages a grooved bushing 149, or equivalent, fastened to rod 141. If arm 148 is rotated, through a small angle, in clockwise direction about its fixed axis 150, the trip 142 is moved to the left and will drop from gage 144 at a smaller radius of the record. Conversely, if the arm is adjusted in counterclockwise direction, through a small angle, the trip 142 is moved to the right on shelf 143 and drops from gage 144 at a larger radius of the record. This adjustment may be effected manually, or, as later shown in another modification, may be effected automatically upon selection of the angular speed of the turntable in compensation for the standardized difference in location of the lead-out grooves of different speed records.

The trip mechanisms heretofore used were actuated either by reversal of direction of the pickup arm as it followed the eccentric lead-out groove of the record, or by acceleration of the tone arm as it followed the lead-out groove, or by a pushing action on an extension of the shaft of the pickup arm as a predetermined radius of the record was approached. With all three prior types, the force required to trip the changer produced a lateral pressure against the sides of the record groove with resultant wear of both the grooves and the needle. Particularly with the very fine grooves of long-playing records and/or for light needle pressures, the lateral needle pressures incident to such prior tripping mechanisms often caused the needle to jump the grooves or to break through the groove walls. These difficulties do not arise with the tripping mechanisms herein shown as they do not produce lateral pressure between the needle and the record groove.

The modification shown in Fig. 25 et seq. has many novel features common to the modifications previously herein described. For example, the horizontal and vertical motions of the pickup arm during the change cycle are produced by a rock-arm actuated by a sleeve whose cam-follower is continuously in engagement with the cam groove on the turntable spindle. Also, the trip mechanism which arrests rotation of the sleeve with the spindle to initiate the change cycle, responds to arrival of the pickup arm at a predetermined radius of the record and effects tripping without producing lateral pressure between the record groove and the pickup needle.

In this modification, the rocking motion of arm 154 (Fig. 26) (corresponding with arm 54 of the preceding figures) is translated into horizontal and vertical motions of the pickup arm by a mechanism CD whose components and their relationships, best shown in Figs. 27 to 29, are now described.

The end of rocker arm 154 remote from the turntable spindle extends through a slot 155 in a bracket 156 extending vertically downward from the underside of the mounting plate 120 of the changer. A spring 157 connected to the projecting tip of the arm biases it toward engagement with the upper end of slot 155. The fingers 158, 159 pivotally mounted at 160, 161 upon bracket 156 on opposite sides of slot 155 are biased by springs 162, 163 to engage opposite sides of arm 154. Spring 162 is connected between arm 154 and arm 164 of finger 158 so that during movement of the arm 154 the finger 158 rotates about its axis 160 to positions determined by the cam surface 165 of the finger. Spring 163 is connected between the other finger 159 and a vertically movable plate 166, later described, so that during movement of rocker arm 154 the finger 159 rotates about its axis 161 to positions determined by the cam surface 167 of finger 159.

As later more fully described and as shown in Figs. 30A–30G, the rotation of arms 158, 159 in a vertical plane is utilized to effect horizontal motion of the pickup arm during the change cycle and accurately to position the pickup arm over the starting groove of a record on turntable 28. The vertical motions of the pickup arm are effected by the vertically reciprocable slide-plate 166, as now described.

The plate 166 is guided for vertical motion in part by a rivet 168 which is fastened to bracket 156 and slidably received by vertical slot 169 of plate 166 and in part by engagement between leg 170 of plate 166 and the pivot pin for arm 158. The spring 163 maintains engagement between the lower edge 171 of plate 166 and the upper edge of arm 154 so that rocking motion of arm 154 is translated into vertical reciprocation of plate 166. The vertical motion of plate 166 is transmitted to the pickup arm by lever 172 which extends through horizontal slot 173 in plate 166. As best shown in Fig. 37B, lever 172 is pivotally mounted on shelf plate 143 at the lower end of the pickup-arm shaft 46 and is connected to the pickup arm by cord 174 which passes through slot 226 (Fig. 25) of baseplate 120. Alternatively the lever 172 could be coupled to a pusher rod extending through a hollow shaft 46 to engage and swing the pickup arm vertically. Thus, the pickup arm is lifted from a record as the plate 166 moves downwardly and is lowered onto a record as the plate 166 moves upwardly.

It is to be noted that in this embodiment, as well as those herein previously described, the upper limit of vertical movement of the pickup arm is only slightly above the top level of a played stack of records on the turntable. It is also to be noted that the movement of the pickup arm to its maximum outer position over the rest 222 and back to the starting position is in a horizontal plane only slightly below the bottom level of a stack to be played. In short, with the changer mechanisms shown, the distance between the bottom level of an unplayed stack and the top level of a played stack is only slightly greater than required for clearance of the pickup arm during playing of the last record of a stack, usually a maximum of ten or twelve records.

It is also to be noted that the transmission of power from the arm 154 to the pickup arm is through spring means 157, 162 and 163 so that practically it is impossible to jam the mechanism, with injury to the motor or any of the changer components, by manually holding the pickup arm or moving it during a change cycle.

From the above description of the mechanism CD and from the schematic showing of Figs. 30A–30G, the cooperation between the components of the mechanism and their positional relationships to the pickup arm at significant times in the record-changing cycle should be clear. In brief, the change sequence starting with the pickup arm on the rest is shown by Figs. 30A, 30B, 30C, 30D, 30C, 30E: the sequence starting with completion of playing of a record is shown by Figs. 30F, 30G, 30D, 30C, 30E.

In the record-changer of Figs. 25, 26, release of the bottom record of the stack is effected by mechanism T (generically similar to mechanism disclosed in my aforesaid applications Serial No. 108,994, now abandoned, and Serial No. 256,524) whose components and operation are shown in Figs. 31–35.

The turntable 28 of this modification is supported by a bracket 175 pivotally mounted on baseplate 120 of the changer and biased by spring 176 to the playing position shown in Fig. 32A. Specifically, the spring 176 is compressed between the underside of baseplate 120 and the head of a screw 177, or equivalent, which freely extends through the baseplate and into the bracket 175. The extensions 178 of the bracket 175 fit into slots of opening 179 in baseplate 120 to serve as a pivot or hinge for the bracket and to keep the bracket in alignment with the baseplate.

The turntable 28 is attached to the upper end of a hollow spindle 180 which passes through bearing 181 in the upper leg of bracket 175. The center post 182 for supporting records above the turntable passes freely through spindle 180 and is fastened at its lower end to the bottom leg of bracket 175.

The sleeve 136 (corresponding with sleeve 36 of the earlier described modifications) is slidably and rotatably received by the spindle 180. The cam-follower ring 138 which loosely fits sleeve 136 is provided with cam-follower extensions 183, 184 which pass through slots 185 of sleeve 136 to engage the reciprocating cam groove 34 of the spindle. A spring retainer ring 186 prevents the cam-follower 138 from dropping out of the sleeve slots but permits it to rock about an axis through extensions 183, 184 and normal to the spindle axis.

During playing of a record, the sleeve 136 rotates with spindle 180 and the cam-follower 138 is horizontal in the closed bottom turn of the cam groove 34. When rotation of the sleeve is arrested by engagement of a projection 137 of the cam-follower ring with structure normally out of its path, the sleeve 136 moves upwardly along the spindle. During such movement, the sleeve 136 engages the end 187 of rocker arm 154 and moves it into engagement with an adjustable screw 188 extending through the baseplate 120 from the upper leg of the bracket 175 (Fig. 32B). Thus, the bracket 175 is swung clockwise about its pivots 178 (Fig. 32B) to move the record post 182 toward the platform P (Figs. 25, 35) which supports an edge of the record stack.

As rotation of the turntable spindle 180 continues, the sleeve 136 reaches the top closed turn of the cam groove 34 and reverses its axial movement. As the sleeve descends, the bracket 175 tilts back to its original position and the upper end of the record post 182 accordingly moves away from platform P to the position shown in Fig. 34. After the sleeve 136 moves out of engagement with arm 154 which has followed it back to the position shown in Fig. 32A, it again reaches the closed bottom turn of the spiral groove 34 and resumes rotation with the turntable spindle so to complete the change cycle.

It is to be noted that the spiral groove 34 of this changer, like that of the changers previously described, is closed at both ends and that the cam-follower is continuously within the groove. There is thus avoided the possibility of jamming inherent in constructions having a cam-follower entering an open-ended groove: such constructions require a precise synchronizing adjustment which is lost with wear. As previously stated, during playing of a record, the cam-follower ring 138 rotates in a horizontal plane in the closed bottom turn of groove 34. When its rotation is arrested by the trip mechanism, it tilts about its axis through extensions 183, 184 so that the cam-follower rides up the righthand spiral of the groove: when the sleeve reaches the upper limit of its travel, the cam-follower tilts in opposite direction and rides down the left-hand spiral of the groove to its original position where the sleeve is again free to rotate.

The manner in which the rocking movement of arm 154 is utilized to effect vertical and horizontal motions of the pickup arm 40 during the change cycle has been described and need not be repeated. The manner in which the tilting movement of bracket 175 is utilized to release the bottom record is shown in Figs. 34 and 35 and now described.

Figures 30A, 30B, 30C, 30D, 30E, 30F, 30G:
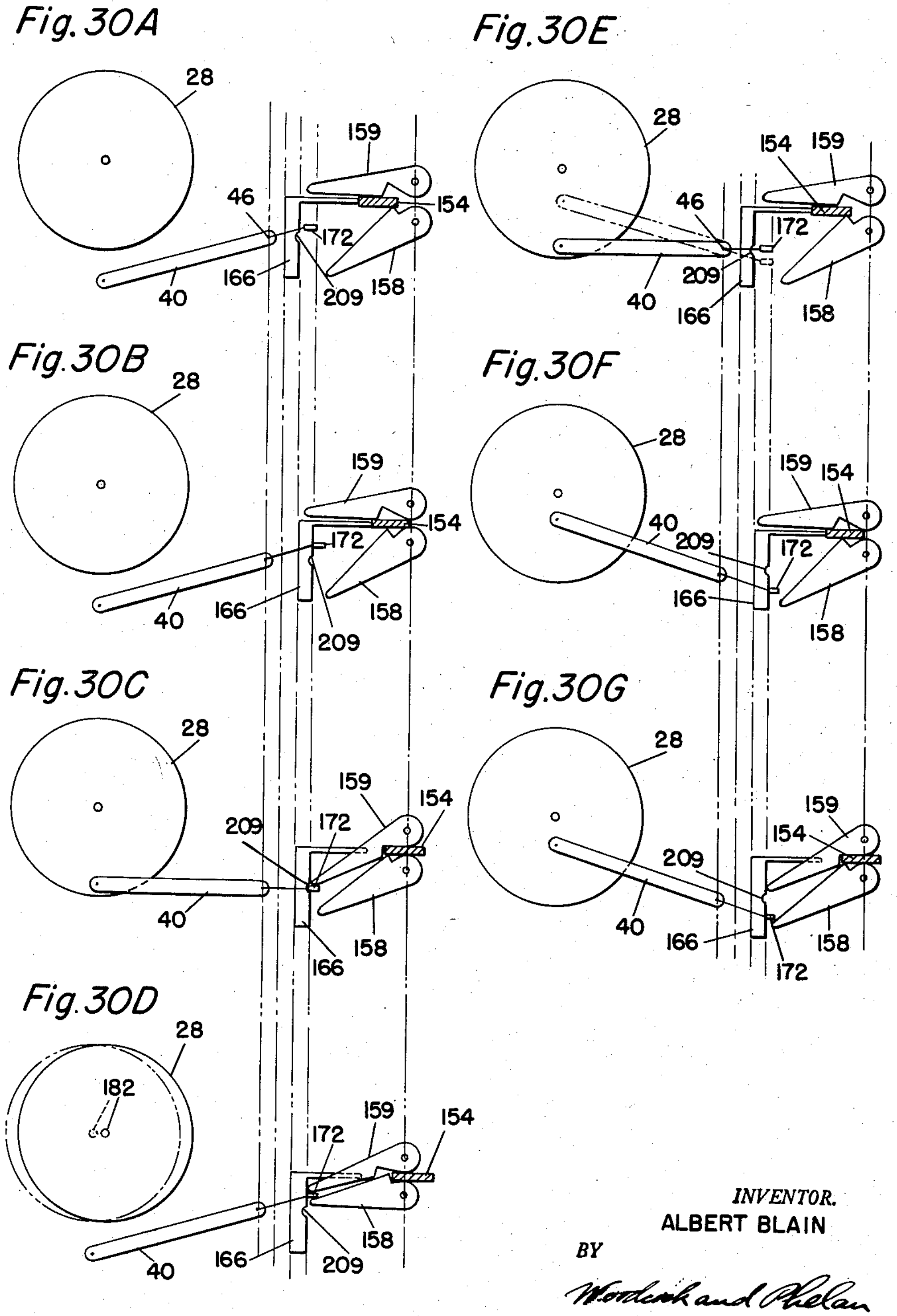

The non-rotatable record post 182 is provided at its upper end with an offset extension 189 which passes through the center holes of the stacked records R. The ledge 190 at the base of the offset supports the bottom record adjacent that side of the center hole which is remote from platform P whose ledge 191 engages the underside of the bottom record near the rim. Thus, during playing of a record, the stack is supported at the center and at one edge in the position shown in Fig. 34. During a change cycle, as above described, the center post 182 is tilted toward the platform P to shift the record stack to the right (Fig. 35). The edge of the bottom record is engaged by vertical shoulder 192 of platform P so that it is pushed off the center post ledge 190 to fall along post 182 onto the turntable. The remainder of the records is prevented from falling as they are temporarily supported by platform P beyond the shoulder 192. During return of the centerpost to the playing position (Fig. 34), the stack is moved to the left and the edge of the next record to be played drops onto the ledge 191 in readiness for release during the next change cycle. As shown in Fig. 30D, the dropping of a record occurs when the pickup arm, under control of rocker arm 154 and mechanism CD, is clear of the path of the falling record. The timing of the release of a record in the change cycle may be adjusted by adjustment of screw 188.

With the changer shown in Figs. 25, 26, rotation of sleeve 136 may be arrested to initiate a change cycle either automatically upon completion of playing of a record, or at will by an operator at any time a record is being played. The former is effected by mechanism CR (Figs. 26, 36A–36C, 37A–37B) substantially similar to that described in discussion of Figs. 22–24 and now briefly described: the latter is effected by reject mechanism PR described in subsequent discussion of Figs. 38A, 38B.

The rod 141 (Fig. 26) is provided at one end with a finger 140 which, during playing of a record, is out of the path of rotation of the projections 137 of the cam-follower ring 138 (Fig. 36A) and at the other end with a trip finger 142 which rides along a shelf 143 attached to the lower end of shaft 46 of the pickup arm (Figs. 36A, 37A). As playing of a record nears completion, the trip finger 142 rides off shelf 143 onto the gage 144 and then at a definite angular position of the pickup arm drops sharply off the gage (Fig. 36B) onto the incline 146 of the shelf so to effect movement of arm 140 from a fully retracted position into the path of extensions 137 to initiate a change cycle. During the change cycle, the shaft 46 is rotated in opposite direction by mechanism CD as above described: arm 140 is thus removed from the path of extensions 137 by movement of trip finger 142 upwardly of the incline 146 and under gage 144 back onto the shelf 143 (Fig. 36C). As in the modification of Figs. 22–24, the angular position of pickup arm 40 for which arm 140 moves into the path of extensions 137 is substantially different from the angular position for which arm 140 is moved out of that path and consequently there is no uncertainty in initiation of the change cycle at the end of playing of a record.

In discussion of Figs. 31–33, it was pointed out that downward movement of sleeve 136 continued beyond the lower limit of movement of rocker arm 154 (Fig. 32A). In such discussion, it was tacitly assumed that the rocker arm 154 had a fixed pivot intermediate its ends (the same as arm 52 of Figs. 1 and 2) and in fact it may have such fixed pivot so far as the preceding description is concerned. By slight modification, now described, of the basic mechanism, there may be incorporated the feature of semi-automatic rejection. Specifically, as shown in Fig. 38C, the lever 154 is provided intermediate its ends with a tongue 152 which extends into a hole 153 in baseplate 120 to provide an intermediate pivot about which the arm 154 is normally rocked by sleeve 136 to effect the previously described movements of the pickup arm. The arm 154 is pulled against the side of slot 193 in spindle bracket 175 by wire 194 which is connected to leaf spring 195 (Figs. 38A, 38B) fastened to the underside of baseplate 120 (Figs. 26, 38A). The free end of spring 195 is engaged by the plunger 197 of a knob 196 accessible from the topside of the baseplate 120.

Normally, the knob 196 is in its upper position (Fig. 38A) for which the spring 195 through wire 194, or equivalent, exerts sufficient pressure between arm 154 and the bracket frictionally to hold arm 154 in its normal lower limit (Fig. 38A and full line position Fig. 32A). In such position, the stop extension 197 of arm 154 is out of the path of rotation of extensions 137 of the cam-follower 138.

To initiate a change cycle before completion of playing of a record, it is only necessary for an operator momentarily to depress the knob 196 (Fig. 38B). This releases the tension upon cord 194 and permits the arm 154 to pivot about its point of engagement with bracket 156: the stop or trip extension 197 of arm 154 is thus dropped (Fig. 38B and dotted-line position Fig. 32A) into the path of the extensions 137 of cam-follower ring 138 to initiate a change cycle during which the pickup arm 40 is promptly lifted from the partially played record and the next record dropped upon the turntable.

For playing records of different diameters, the platform P is rotatable and has a corresponding number of edge-supporting ledges angularly spaced about its axis of rotation at different radial distances respectively suited to the different record diameters. The particular platform P shown in Figs. 25 and 39 adapts the changer for playing three sizes of records, for example, 12-inch, 10-inch or 7-inch records. When the platform is in the position shown in Fig. 25, the ledge 191B is in position to support the bottom record of a stack of 7-inch records on the turntable center post 182; by rotating the platform counterclockwise through approximately a quarter revolution, the ledge 191C is swung to the 10-inch record position (Fig. 39); rotation of the platform another half revolution brings ledge 191A into the 12-inch record position. The platform P may have a smaller or greater number of ledges corresponding with the number of record sizes to be played.

The shaft 198 for platform P extends through a hollow post (not shown) extending upwardly from the top face of baseplate 120. The proper angular positions of platform P for the different record diameters are defined by a click plate 199 attached to the lower end of shaft 198 below the baseplate 120 (Fig. 39). Each of the notches 200 in plate 199 respectively corresponds with one of the ledge settings of platform P and is adapted to receive a roller, or equivalent detent carried by the biased arm 201.

The rotation of platform P for a selected record diameter is utilized to shift the axis of shaft 46 of the pickup arm so that the pickup will concurrently be repositioned above the starting groove of that size of record. The bearing post 202 for shaft 46 extends through slot 203 (Fig. 25) in baseplate 120 and is supported at its lower end by slide 204 (Fig. 39). The guide slots 205 of slide 204 respectively slidably receive shaft 198 and the shank of a stud or bolt extending from the underside of baseplate 120. The cam-follower 206 carried by slide 204 engages a cam rotatable with platform shaft 198: specifically in the particular construction shown, the click plate 199 has three cam-lands 207A, 207B, 207C for selectively engaging the cam-follower as platform P is rotated to the three corresponding record-diameter positions. The slide 204 is biased to maintain engagement between its follower 206 and cam 199 by spring 208 connected between the slide and the detent arm 201.

Thus concurrently with change in setting of platform P to play records of selected diameter, the axis of rotation of shaft 46 of the pickup arm 40 is so shifted that the position of alignment of arm 172 (Figs. 29, 30C, 37) with starting notch 209 of plate 166 of the mechanism CD corresponds with that angular position of the pickup arm 40 for which its needle will engage the starting groove of records of the selected diameter.

Figs. 40A, 40B and 40C illustrate the positions of the axis of shaft 46 and the angular starting positions of the pickup arm with respect to that axis for the 12-inch, 7-inch and 10-inch record settings of platform P.

To permit precise adjustment of such position without need for expensive precision machining, cam-follower 206 is mounted (Fig. 39) on slide 204 by an eccentric stud which may be adjusted by a screw-driver through an opening (not shown) in the baseplate 120.

The record changer shown in Figs. 25, 26 is suited for playing records recorded at different speeds, for example, 78 R. P. M., 45 R. P. M. and 33 R. P. M. The lever 210 controls a speed-change mechanism (not shown) between the shaft of motor 22 and the rim of drive wheel 24. To move the lever 210 to any selected one of its three settings, it is connected by rod 212 (Figs. 26 and 41) to a lever 213 attached to shaft 197 of knob 196. The movement of this rod is utilized to shift the position of finger 142 of the trip mechanism in compensation for the difference in radii of the lead-out grooves of the different sizes of records. For such purpose, the bearing bracket 214 for rod 141 is slidably mounted to the underside of baseplate 120 and has a vertical extension 215 for engagement with rod 212.

With lever 213 in position for playing of 78 R. P. M. records, the spring 216 biases the slide bracket 214 to the limiting position (full lines, Fig. 41) defined by engagement of stop 217 with the lower end of slot 218. When lever 213 is moved to the 45 R. P. M. position or to the 33 R. P. M. position, the bar 212 moves to the dotted-line position and in so doing pushes the finger bracket 214 to the dotted position against the bias of spring 216. In this arrangement, the lateral displacement of rod 212 is utilized to move bracket 214: equivalently, its longitudinal displacement may be utilized for such purpose by cam projections spaced lengthwise of the rod successively to engage the bracket extension 215, or equivalent. Precise timing of the release of trip 142 and therefore of movement of arm 140 into the path of rotation of projections 137 of the spindle cam-follower may be effected by angular adjustment of stop 217: such adjustment corresponds with that afforded by adjustment of arm 148 (Fig. 22A).

By addition of a few simple elements shown in Figs. 42A–42D, the record changer of Figs. 25, 26 may be modified so that the last record of the stack will not be repeatedly played. A feeler rod 220 extends through the supporting post 198 of the record platform P and is bent over toward the turntable 28. The lower end of the feeler rod is connected to a lock bar 221 biased as by spring 228, to engage finger 159 of the change mechanism. So long as there are any records on the platform, the feeler 220 is held up to maintain the lock bar 221 out of the path of the finger 159 (in Fig. 42C—in full-line position—and Fig. 42B) and consequently the records are played in sequence as previously described herein. When the last record falls from the platform P, the feeler 220 falls to the dotted-line position (Fig. 42C) and the lock bar 221 swings into engagement with cam face 227 of finger 159 (Fig. 42B). When, during the change cycle, the finger 159 returns to its rest position, the lock bar drops into slot 229 (Fig. 42A). Upon completion of playing of the last record, the finger 158 operates in usual manner to swing the pickup arm 40 to its outer limit above the rest 222: however, as finger 159 is restrained by the lock bar (Fig. 42A), it does not, as in the normal change cycle, move the pickup arm from that position to one over the starting groove of the record. Consequently, when the plate 166 of mechanism CD ascends, the pickup arm is lowered onto rest 222 instead of onto the record. Repeated playing of the last record is thus precluded.

The motor 22 may then be deenergized by opening the switch 225. To play another stack of records, the feeler 220 is lifted to allow the stack to be positioned over the turntable and to remove the locking bar 221 from finger 159. The changer is restarted in normal manner by closing switch 224 and momentarily depressing button 196 to initiate a change cycle.

Automatically to turn off the motor 22 and the amplifier system upon completion of playing of the last record, an actuating plunger 223 of a sensitive switch 224 may extend through the rest 222 (Fig. 42D). This switch is in replacement of switch 225. Thus, when the pickup arm is automatically lowered onto the rest 222 after completion of playing of the last record of a stack, the switch 225 is automatically operated to break the motor and amplifier circuits.

To play another stack of records, the feeler 220 is lifted so that the stack may be supported on post 182 and platform P. Lifting of the feeler retracts the locking bar 221 from engagement with arm 159 so that it is free to move the pickup arm over the starting groove when the changer is started. When rest-switch 224 of Fig. 42D is used, such starting is effected simply by lifting the pickup arm from the rest and momentarily depressing the button 196. Alternatively, by momentarily depressing button 196 and momentarily closing a switch in parallel to switch 224, it is not necessary manually to lift pickup arm 40 from the rest 222.

The starting sequence, when the lock-bar and stack feeler are used, is Figs. 42A, 30D, 30C, 30E; the sequence upon completion of all but the last record is Figs. 30F, 30G, 30D, 30C, 30E: the sequence upon completion of the last record is Figs. 30F, 30G, 42A.

It shall be understood that the invention is not limited to the specific constructions shown and that it comprehends equivalent constructions within the scope of the appended claims.

This application is in part a continuation of my copending applicaiton Serial No. 624,965, filed October 27, 1945, formally abandoned in favor of this application.

What is claimed is:

1. A record changer mechanism comprising a turntable spindle having a reciprocating cam groove closed at both ends, a sleeve on said spindle and pivotally supporting a cam-follower continuously in engagement with said cam groove and rotatable with said spindle during playing of a record, and means for initiating a change cycle comprising means for arresting rotation of said sleeve to effect tilting of the cam-follower and resultant axial movement of the sleeve and cam-follower by cooperation of the tilted cam-follower with said cam groove.

2. An arrangement as in claim 1 in which the last-named means is a pivoted arm positioned in the path of axial movement of said sleeve and biased toward engagement therewith, and in which trip means is provided to release said arm to initiate a change cycle.

3. An arrangement as in claim 2 in which the trip means is actuated by means responsive to the angular position of the pickup arm of the changer at completion of playing of a record.

4. An arrangement as in claim 2 in which the trip means may be manually operated during playing of a record.

5. An arrangement as in claim 1 in which the cam-follower sleeve combination has at least one radial projection, and in which the last-named means comprises a biased member held out of the path of rotation of said projection during playing of a record by resting engagement with the upper surface of a shelf rotatable with the pickup arm and from which said member drops upon completion of playing of a record to release said biased member for movement into said path to initiate a change cycle.

6. An arrangement as in claim 5 in which the shelf is provided with a pivoted gage serving as an extension thereof and with an incline up which the biased member rides after abrupt fall from said gage to initiate a change cycle.

7. An arrangement as in claim 1 in which the cam-follower is pivotally supported on the sleeve and has at least one radial projection, and in which the last-named means comprises a biased member held out of the path of rotation of said projection during playing of a record by a shelf rotatable with the pickup arm and from which said member drops upon completion of playing of a record.

8. An arrangement as in claim 5 in which the shelf is provided with a pivoted gage and an incline up which the biased member rides after abrupt fall from said gage to initiate a change cycle.

9. An arrangement as in claim 1 including a pivoted arm engaged and rocked by said sleeve during axial movement thereof, a group of plates relatively moved by said arm in parallel vertical planes and having surfaces whose relative positions in mutually perpendicular planes vary in accordance with the angular position of said pivoted arm, and structure engaging said surfaces for actuation by said movement of said plates and connected to the pickup arm of the changer to effect vertical and horizontal motions thereof during a change cycle.

10. An arrangement as in claim 9 in which the pivoted arm is biased to engage the sleeve, and in which trip means is provided to release the pivoted arm to arrest rotation of the sleeve and so initiate a change cycle.

11. An arrangement as in claim 9 in which a second arm is biased to arrest rotation of the sleeve, and in which trip means is provided to release said second arm to arrest rotation of the sleeve to initiate a change cycle.

12. An arrangement as in claim 1 including a pivoted arm engaged and rocked by said sleeve during axial movement thereof, a vertically reciprocable plate and a pair of pivoted plates rotatable in parallel vertical planes and coupled to said pivoted arm, and a member engageable by said plates and connected to the pickup arm of the changer to effect horizontal and vertical movements thereof during a change cycle.

13. An arrangement as in claim 12 in which said plates are coupled to said arm by spring means to avoid jamming if the pickup arm is restrained during a change cycle.

14. In a record-playing device having a pickup arm mounted for vertical and horizontal movement and provided with a needle for engaging a record groove, means having a cycle of operation during which it effects vertical and horizontal movements of said pickup arm, and a trip mechanism for initiating a cycle of said means without producing lateral pressure between the pickup needle and the record groove comprising as components a shelf member rotatable in a horizontal plane concurrently with horizontal movement of said pickup arm, and a trip member pivotally mounted in position to rest upon said rotatable shelf during playing of a record and to fall therefrom at predetermined horizontal angular position of said pickup arm for coaction with said means to initiate a cycle of operation thereof.

15. An arrangement as in claim 14 in which the rotatable shelf member has a downwardly extending incline and a pivoted gage overlying the incline as a continuation of said shelf, and in which the trip member during playing of a record rides along the shelf and onto the gage, abruptly drops from the gage at a predetermined angular position of the pickup arm and during said cycle rides up the incline and under the gage back onto the shelf.

16. In a record-playing device having a turntable and a pickup arm with a needle for engaging the groove of a record on said turntable, a normally stationary slide supporting said pickup arm cycling for horizontal and vertical movement, a rotatable shelf member supported by said slide for rotation in a horizontal plane concurrently with horizontal movement of said pickup arm, means having a cycle of operation during which it effects vertical and horizontal movements of said pickup arm, a trip member pivotally mounted on said slide in position to rest upon said rotatable shelf during playing of a record and to fall therefrom at predetermined horizontal angular position of said pickup arm for coaction with said means to initiate a cycle of operation thereof, a record-supporting platform rotatable about an axis in fixed position from the axis of said turntable and having angularly spaced ledges for respectively supporting records of different diameter, said cycling means including means for dropping a record from said platform onto said turntable during a cycle of operation, and cam and cam-follower means coupling said platform to said slide to change the location of the axis of horizontal movement of said pickup arm concurrently with the rotation of said platform to support records of selected diameter.

17. In a record-playing device having a pickup pivotally mounted for vertical and horizontal movement, a movable member which is at rest during playing of a record, means for effecting movement of said member from and back to its playing position during a cycle between successive record plays, a reciprocable plate biased to engage said member to follow its aforesaid movement, a pair of pivoted cam plates biased to engage opposite sides of said member to swing in opposite directions during aforesaid movement thereof, and an arm coupled to said pickup and engageable by said plates to effect vertical and horizontal movement of the pickup during aforesaid movement of said member, said reciprocable plate having a notch for receiving said arm when moved by one of said pivoted plates to position corresponding with location of the pickup above the starting groove of a record.

18. In a record changer mechanism having a pickup pivotally mounted for vertical and horizontal movement, a movable member which is at rest during playing of a record, means for effecting movement of said member from and back to its playing position during a change cycle, a reciprocable plate biased to engage said member to follow its aforesaid movement, a pair of pivoted cam plates biased to engage opposite sides of said member to swing in opposite directions during aforesaid movement thereof, an arm coupled to said pickup and engageable by said plates to effect vertical and horizontal movement of the pickup during aforesaid movement of said member, a reciprocable slide mount for said arm and said pickup, a rotatable platform with angularly spaced ledges for supporting the rim of records of different diameters, and cam and cam-follower means coupling said slide to said platform to shift the angular position for which said arm is received by the notch of the reciprocable plate.

19. An arrangement as in claim 17 additionally including means for shifting the angular position for which said arm is received by said notch of the reciprocable plate to determine the angular position of said pickup for which it is lowered by said arm onto a record for playing.

20. In a record changer mechanism having a pickup pivotally mounted for vertical and horizontal movement, a movable member which is at rest during playing of a record, means for effecting movement of said member from and back to its playing position during a change cycle, a reciprocable plate biased to engage said member to follow its aforesaid movement, a pair of pivoted cam plates biased to engage opposite sides of said member to swing in opposite directions during aforesaid movement thereof, an arm coupled to said pickup and engageable by said plates to effect vertical and horizontal movement of the pickup during aforesaid movement of said member, a platform for supporting a stack of records to be played, a feeler supported by the top record of the stack for release when said stack is depleted, and a stop actuated upon release of said feeler to preclude movement of one of said pivoted cam plates and so prevent replaying of the last record of the stack.

21. An arrangement as in claim 20 additionally including a rest above which the pickup arm is positioned by the other of said pivoted cam plates and onto which it is moved by the reciprocable plate in the change cycle following playing of the last record of a stack, and a switch responsive to engagement of the pickup arm with said rest to deenergize the motor of the record changer.

22. A record changer comprising a turntable, a drive motor for said turntable, a speed-change lever operable to different positions to select different speeds of drive of said turntable by said motor to accommodate different types of records, a lever manually operable to different speed settings, a link between said levers having different positions respectively corresponding with a selected speed, a change-cycle mechanism, a pair of normally disengaged members engageable at the end of playing of a record to initiate a change cycle of said mechanism, and a movable support for one of said members actuated by said link concurrently with selection of a turntable speed to effect a relative adjustment of the engaging position of said members in compensation for the differences in radii of the lead-out grooves of different types of records.

23. An arrangement as in claim 22 in which one of said members rotates about the axis of the turntable, and in which the other of said members is a trip member, and which there is included a shelf rotatable with the pickup to support said trip member and hold it from the rotatable member during playing of a record and from which the trip member falls when the pickup rides the lead-out groove of the record to initiate a cycle of said mechanism.

24. An automatic record changer comprising a turntable, a non-revolving post extending through said turntable in the axis of rotation thereof and having an offset upper portion to extend through a stack of records with a step to engage the bottom record of the stack adjacent its center hole, a rotatable platform spaced from said post and having angularly spaced ledges at different radial distances from the axis of rotation of said platform, each of said ledges having an upwardly extending shoulder for engaging the rim of a bottom record engaged by said step, a bracket supporting said turntable and said post and tiltably supported for movement in a vertical plane through said axis of rotation, means operative in a change cycle to tilt said bracket and move said post in said plane to drop upon the turntable the bottom record of a stack supported at its center by said step and at its rim by a selected one of said ledges, a pickup arm having a rotatable shaft, a cam rotatable with said platform and having cam lands corresponding with said ledges, and a reciprocating slide for supporting said shaft of the pickup arm of the changer and having a cam-follower for successively engaging said lands to reposition said shaft concurrently with rotation of said platform to bring one of said ledges in position to support the edge of a stack of records of selected diameter.

25. An arrangement as in claim 24 additionally including a shelf member rotatable with said shaft of the pickup arm, and a trip member biased to drop from said shelf upon completion of playing of a record to initiate operation of said mechanism which moves the post to drop the next record of the stack.

26. A record changer for playing records of different diameters and recorded at different speeds comprising a turntable having a spindle with a reciprocating cam groove, a pivotally mounted bracket for said spindle, a pickup arm mounted for vertical and horizontal movement, means for supporting a stack of records of selected diameter above said turntable and the path of movement of the pickup arm comprising a non-rotatable center post extending through said turntable spindle and a platform rotatable about an axis at a fixed distance from the normal axis of the center post to angular position corresponding with the diameter of the selected stack; a cam rotatable with said platform, a reciprocable slide having a cam-follower engaging said platform cam; an assembly movable as a unit with said slide comprising a rotatable shaft, a pickup arm pivotally mounted on said shaft, a shelf attached to said shaft and having a downwardly extending incline, a gage overlying said incline to serve as a continuation of said shelf during playing of a record, and a pivoted arm attached for rotation with said shaft and having a connection to said pickup; mechanism for effecting vertical and horizontal movement of the pickup arm during a change cycle comprising a group of plates for engaging said arm of the assembly: means for effecting movement of said plates and rocking movement of said bracket, comprising a rocker arm, one end of which engages said plates and the opposite end of which is adjacent the spindle of said turntable, and a cam-follower sleeve rotatable with said spindle during playing of a record; tripping means including a biased member releasable to arrest rotation of said sleeve and effect axial movement thereof by coaction with said reciprocating cam groove so to actuate said rocker arm, and a trip member supported by said shelf and gage during playing of a record and falling from said gage upon completion of playing of a record to release said biased member, said trip member riding up said incline of said shelf as said pickup arm is moved by said plates upwardly and away from the spindle of the turntable; a motor for driving said turntable, a speed selector for said motor including a member having different positions each corresponding with a selected speed, and a movable support for said trip actuated by said speed-selector member to shift the timing between dropping of said trip and consequent arrest of rotation of said sleeve by said biased member.

27. An arrangement as in claim 26 in which the rocker arm is biased toward engagement with said sleeve to arrest its rotation, and a manual trip for releasing said rocker arm to initiate a change cycle at any time during playing of a record.

28. In a record playing device having a pickup arm with a needle for engaging a record groove, a shelf rotatable with said pickup arm; gravity trip means including a trip member supported by said shelf during playing of a record and abruptly falling therefrom upon completion of playing, means for raising said trip member for resupport by said shelf, and means providing a substantial difference between the angular positions of said arm respectively for which said trip member falls from said shelf and for which said trip member is again supported by said shelf.

29. A record playing device comprising a turntable, a pickup supported for vertical and horizontal movement, means for selecting different speeds of operation of said turntable to suit different records including a movable member having positions corresponding with the different speeds, cycling means having a cycle of operation during which it effects vertical and horizontal movement of said pickup, means for initiating a cycle of said cycling means including a trip element movable upon completion of playing a record from a standby position to coact with said cycling means, and a movable support for said trip element moved by said movable member of said speed-selection means to vary the standby position of said movable element in correspondence with the speed selection and so change the extent of movement of said trip member upon completion of playing of a record in compensation for the difference in radii of the lead-out grooves of said different records.

30. In a record playing device having a pickup arm, a shelf rotatable with said pickup arm in a horizontal plane, a trip member mounted for rotation in a vertical plane and for movement in a horizontal plane, said trip member resting on said shelf during playing of a record and abruptly falling therefrom upon completion of playing of a record, and adjusting means for moving said trip member horizontally to vary the relation of said vertical plane to the axis of rotation of said shelf and so select the angular position of said pickup arm at which said trip member abruptly falls from said shelf.

31. An arrangement as in claim 30 in which the record playing device includes a member having different settings for different speeds of operation of said turntable, and in which said member is coupled to said adjusting means of claim 30 effectively to vary the drop-off position of said shelf in correspondence with the setting of said member.

32. A record changer comprising a stack-supporting platform rotatable to angular positions corresponding with different diameter records, a post for rotatably supporting the pickup of the changer, a reciprocable slide on which said post is mounted, a cam rotatable with said post, a cam-follower for said cam, and an eccentric for mounting said cam-follower on said slide adjustable precisely to determine the position of said post for each of said angular positions of said platform.

33. In a record-playing device, mechanism comprising a rotatable driving member having a reciprocating cam groove closed at both ends, a collar about said driving member having a cam-follower continuously in engagement with said cam groove and normally rotating with said driving member during playing of a record, and means controlled from the lead-out groove of a record for arresting rotation of said collar so to effect tilting of the cam-follower and reciprocation of the collar and cam-follower axially of said driving member by cooperation of said cam-follower with said cam groove.

34. Mechanism as in claim 33 in which said means includes an arm in the path of reciprocation of said collar, means releasably to restrain said arm from frictional engagement with said collar when at a limit of its said path and there rotating with said driving member, and release means freeing said arm for engagement with said collar to arrest its rotation and for actuation by said collar during its aforesaid reciprocation.

35. Mechanism as in claim 33 in which the cam-follower collar has at least one radial projection, and in which said means includes structure normally out of the path of rotation of said radial projection and movable into said path to effect aforesaid reciprocation of said collar.

References Cited in the file of this patent

UNITED STATES PATENTS

| | | |
|---|---|---|
| 1,392,172 | Keller | Sept. 27, 1921 |
| 1,556,668 | Blash | Oct. 13, 1925 |
| 1,966,692 | Small et al. | July 17, 1934 |
| 2,207,706 | Andrews | July 16, 1940 |
| 2,343,992 | Morrison | Mar. 14, 1944 |
| 2,376,741 | Weaver | May 22, 1945 |
| 2,387,916 | Knox et al. | Oct. 30, 1945 |
| 2,396,094 | Gay | Mar. 5, 1946 |
| 2,436,529 | Pressley | Feb. 24, 1948 |
| 2,488,137 | Morrison | Nov. 15, 1949 |
| 2,517,165 | Ascoli | Aug. 1, 1950 |

(Other references on following page)

UNITED STATES PATENTS

| | | |
|---|---|---|
| 2,529,019 | Hardy | Nov. 7, 1950 |
| 2,564,290 | Williamson et al. | Aug. 14, 1951 |
| 2,576,125 | Lapish | Nov. 27, 1951 |
| 2,579,175 | Dale | Dec. 18, 1951 |
| 2,591,515 | Dale | Apr. 1, 1952 |
| 2,634,135 | Carson | Apr. 7, 1953 |
| 2,652,258 | Dale et al. | Sept. 15, 1953 |
| 2,676,805 | Tourtellot | Apr. 27, 1954 |
| 2,682,411 | Carlson | June 29, 1954 |

FOREIGN PATENTS

| | | |
|---|---|---|
| 590,563 | Great Britain | July 22, 1947 |

UNITED STATES PATENT OFFICE
CERTIFICATE OF CORRECTION

Patent No. 2,878,024 March 17, 1959

Albert Blain

It is hereby certified that error appears in the printed specification of the above numbered patent requiring correction and that the said Letters Patent should read as corrected below.

Column 4, line 52, for "which" read -- with --.

Signed and sealed this 7th day of June 1960.

(SEAL)
Attest:

KARL H. AXLINE
Attesting Officer

ROBERT C. WATSON
Commissioner of Patents